United States Patent [19]
Ghirardi

[11] 3,711,632
[45] Jan. 16, 1973

[54] END FITTING FOR CORRUGATED CONDUIT

[75] Inventor: Paul S. Ghirardi, Masury, Ohio

[73] Assignee: General Motors Corporation, Detroit, Mich.

[22] Filed: Dec. 2, 1971

[21] Appl. No.: 204,121

[52] U.S. Cl.............174/135, 174/72 A, 174/74 R, 174/92, 285/419, 285/DIG. 4
[51] Int. Cl. ..............................................H02g 3/02
[58] Field of Search ....174/40 CC, 71 R, 72 A, 74 R, 174/92, 135, 138 R, 138 F, 156; 24/16 PB, 73 PF, 73 PB, 129 R, 255 C; 285/373, 419, 423, DIG. 4

[56] References Cited

UNITED STATES PATENTS

| | | | |
|---|---|---|---|
| 3,151,905 | 10/1964 | Reuther et al. | 174/72 A UX |
| 3,183,302 | 5/1965 | Wochner et al. | 174/92 X |

Primary Examiner—Laramie E. Askin
Attorney—W. E. Finken et al.

[57] ABSTRACT

In a preferred form, this disclosure relates to an end fitting for use for a flexible, plastic, axially slit, corrugated tube for housing a plurality of electrical leads. The end fitting includes a pair of sections of generally semicircular cross-sectional shape which are integrally hinged by a hinge means along their adjacent side edges thereof and which are foldable about the hinge means to a closed position in which they surround the corrugated tube, and a releasable latching means for latching the sections together in their closed position. One end portion of each of the sections has arcuate, circumferentially and radially inwardly extending ribs which are adapted to be received between adjacent ones of the corrugations of the corrugated tube to lock the end fitting against relative movement axially of the tube, and the other end portions of the sections each have a radially inwardly extending member, the inwardly extending members defining a chordially extending barrier when the sections are in their closed positions so as to position the leads within the end fitting.

3 Claims, 4 Drawing Figures

PATENTED JAN 16 1973

3,711,632

INVENTOR.
Paul S. Ghirardi
BY
W.A. Schuetz
ATTORNEY

END FITTING FOR CORRUGATED CONDUIT

The present invention relates to a fitting means, and in particular to an end fitting which is adapted to be attached to an axially slit, plastic, flexible corrugated tube for housing a plurality of electrical leads.

In automobiles manufactured by the assignee of the present invention, the various electrical components of the vehicle are electrically connected with the battery via electrical leads or wires. Various ones of these leads are usually grouped together via tape wrapped therearound or housed in a housing to form what is commonly termed a wiring harness. One highly satisfactory type housing for housing the various electrical leads is a plastic, flexible, corrugated tube which is axially slit throughout its length. These corrugated tubes are highly versatile in that they can be readily bent and the axial slit enables a lead or leads to be removed therefrom at any location along their length. Another advantage of such corrugated tubing is that even though it is axially slit, it will not come apart and thus, serves to house the various leads within the tube.

The present invention provides a novel end fitting which is adapted to be attached to an end portion of the corrugated tube and which positions the leads emanating from the end of the corrugated tube so as to prevent the same from moving axially along the slit in the tube.

Accordingly, an important object of the present invention is to provide a new and improved end fitting for use with an axially slit, flexible, corrugated tube for housing a plurality of electrical leads, and in which the end fitting is adapted to be detachably connected to an end of the corrugated tube and serves to position the leads emanating from the tube so that they cannot move axially along the slit in the tube.

Another object of the present invention is to provide a new and improved end fitting, as defined in the preceding object, and in which the fitting means comprises a pair of generally semicircular sections which are integrally hinged along adjacent side edges thereof and which can be moved from an open position to a closed position in which they surround the tube and a releasable latching means for latching the sections in their closed positions, and in which one end portion of the sections is provided with radially inwardly and circumferentially extending ribs which are adapted to be received between the adjacent corrugations of the tube to hold the same in place on the tube, and in which the other end portions thereof have radially inwardly extending members which define a chordially extending barrier when the sections are in their closed position so as to position the electrical leads emanating from the tube at a location opposite the slit in the tube so that the leads cannot move axially along the slit.

Yet another object of the present invention is to provide a new and improved end fitting as defined in the next proceeding object, and in which the radially inwardly extending member on one of the sections is quadrant shaped and in which the radially inwardly extending member of the other section includes a V-shaped notch and an inclined side edge, and in which the member of the other section cooperates with the quadrant shaped member to trap one of the leads within the notch while its inclined side edge cams the other leads on the other side of the chordially extending barrier so that the trapped lead serves to hold all of the leads in place axially along the tube.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which.

The present invention provides a novel end fitting 10 for use with a flexible, axially slit, plastic corrugated tube T for housing a plurality of electrical leads L. The end fitting 10 serves to position the leads extending outwardly from the end of the corrugated tube and prevents the leads L from moving axially along the axial slit 11 in the tube T.

The individual corrugations 12 of the corrugated tube T could be of any shape, as viewed in cross section, but preferably are generally trapezoidal in shape and the slit 11 preferably extends throughout the axial length of the tube T. It has been found that this type of tubing is highly versatile and that it can be bent and flexed in all directions and yet not cause any significant widening of the slit 11. The primary function of the slit 11 is to enable a lead or leads L to be removed at any location along the length of the corrugated tube T.

The end fitting 10 is generally cylindrical in shape and is adapted to be attached to an end portion of the tube T. The end fitting 10 primarily serves the purpose of preventing the leads L emanating therefrom from moving axially along the slit 11 and to clamp one of the leads L so that the entire group or bundle of leads is more or less held against axial movement relative to the tube T.

Figure 1:
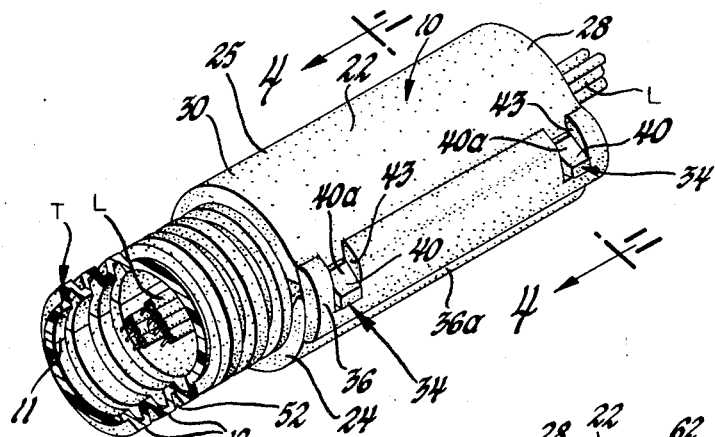
FIG. 1 is a fragmentary perspective view of a preferred embodiment of an end fitting of the present invention and showing the same attached to an axially slit corrugated tube.
Figure 2:
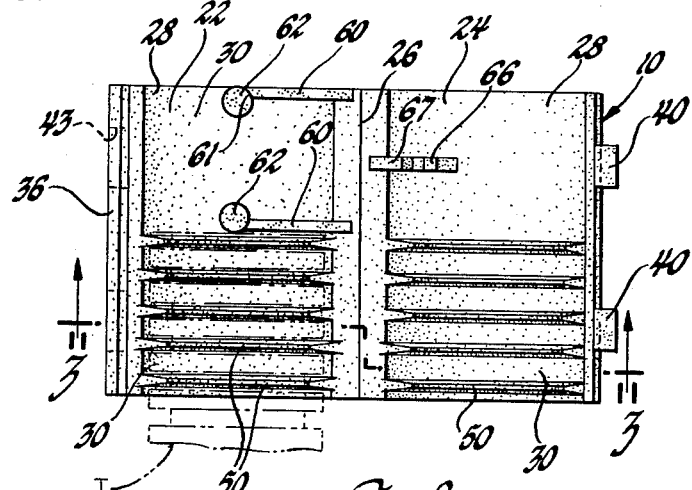
FIG. 2 is a plan view of the end fitting shown in FIG. 1 and showing the same in its open position.

The end fitting 10 comprises a pair of sections 22 and 24 which are semicircular, as viewed in cross-section. The sections 22 and 24 have a smooth exterior 25 and are integrally hinged via a thin web or hinge 26 along their adjacent side edges. The end fitting 10 is molded in its open position, as shown in FIG. 2, in which the sections 22 and 24 are disposed side by side. The sections 22 and 24 can be folded about the hinge 26 toward a closed position, as shown in FIG. 1, in which they surround an end portion of the corrugated tube T. When in the closed position, the end fitting 10 is generally circular, as viewed in cross-section. The sections 22 and 24 each define first and second end portions 28 and 30.

The sections 22 and 24 are adapted to be latched in a closed position by a releasable latching means 34. The releasable latching means 34 comprises a catch member 36 integral with a side wall 38 of the section 22 and a pair of spaced latch members 40 integral with a side wall 42 of the section 24, respectively. The latch members 40 are adapted to be snapped fittingly received within the catch member 36.

The catch member 36 extends tangentially of the side wall 38 and has a pair of spaced slots 43 disposed inwardly of its free end 36a. The latch members 40 are in the form of ribs or projections which extend radially outwardly from the side wall 42 of the section 24. The latch members 40 have tapered upper surfaces 40a.

When the sections 22 and 24 are moved about their hinge 26 to their closed position, the free end 36a of the catch member 36 engages the upper surfaces 40a of the latch members 40 whereupon the catch member 36 is caused to be deflected radially outwardly from its normal free state position until the slots 43 are aligned with the latch members 40. When this occurs, the catch member 36 will move radially inwardly toward its normal free state position, due to its inherent elastic characteristics. When the latch members 40 are received within the slots 43, the latch members 40 are locked within the catch member 36.

The sections 22 and 24 at their end portions 30 have a plurality of axially spaced, arcuate, circumferentially and radially inwardly extending ribs 50 which are adapted to be received within recesses 52 between adjacent ones of the corrugations 12 of the corrugated tube T. The ribs 50 serve to lock the end fitting 20 in place on the end of the tube T and prevent relative axial movement therebetween.

Figure 3:
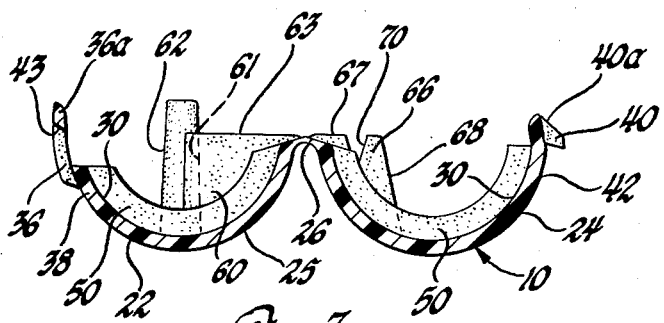
FIG. 3 is a cross-sectional view taken approximately along line 3—3 of FIG. 2.
Figure 4:
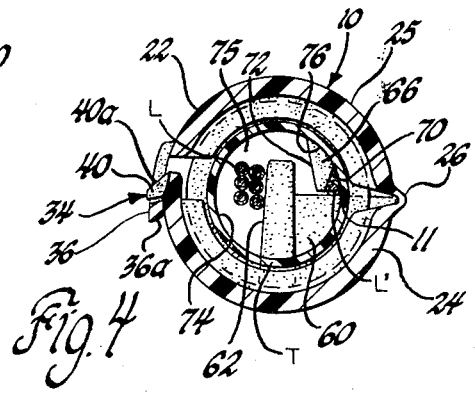
FIG. 4 is a cross-sectional view taken approximately along line 4—4 of FIG. 1.

The section 22 adjacent its other end portion 28 has a pair of axially spaced radially inwardly extending ribs or members 60. The members 60 are quadrant shaped and are integrally formed at their side 61 with radially inwardly extending cylindrical projections 62. The members 60 have a top side 63 which define with the side 61 an included angle of 90°. The cylindrical projections 62 extend upwardly above the top side 63, as shown in FIG. 3. The other section 24 at its end portion 28 has a radially inwardly extending rib or member 66 intermediate the ends of the end portion 28. The member 66 has a top side 67 which is flush with the top side 63 of the member 60 when the sections 22 and 24 are in their open position, as shown in FIG. 3. The member 66 has a side 68 which linearly tapers and which defines with the top side 67 an obtuse included angle. The top side 67 of the member has a V-shaped or triangularly shaped notch 70 therein.

When the sections 22 and 24 of the end fitting 10 are folded about the corrugated tube T, the members 60 and 66 together define a chordially extending barrier 72. This chordially extending barrier 72 defines with a side wall portion 74 of the corrugated tube T a generally semicircular opening 75 through which all but one of the leads L passes. The end fitting 10 would be positioned on the corrugated tube T so that the opening 75 would be on the side opposite the side wall portion 76 of the corrugated tube T containing the axial slit 11 so that the leads L passing through the end of the corrugated tube T cannot move axially along the slit 11 in the tube T.

Moreover, it should be noted that the group of leads L contained within the corrugated tube T is usually taped together at one or more longitudinally spaced locations along the bundle of wires or the bundle of leads L is twisted together. To prevent the bundle of leads L from moving axially relative to the corrugated tube T, one of the leads L' is adapted to be clamped between the members 60 and 66 when the sections 22 and 24 are folded to their closed positions about the end of the corrugated tube T. That is, when the end fitting 10 is being attached to the corrugated tube T, the top side 63 of the members 60 are engaged by the bundle or group of leads L. Then as the section 24 is folded about the hinge 26 to its closed position, the top and sides 67 and 68 of the member 66 engages the leads L and causes all but one of the leads L' to be cammed radially outwardly over the cylindrical pins 62 or against the pins 62. As the leads L are being cammed, one of the leads L' will be received within the triangularly shaped notch 70 and be trapped therein and held clamped against the top side 63 of the members 60. This retains one of the leads L' in position and holds it against relative axial movement within the corrugated tube T. Since this lead L' is either taped or intertwined with other leads L, it will also serve to hold all of the other leads L in their predetermined position longitudinally of the corrugated tube T.

It will, of course, be understood that if the notch 70 for retaining or holding the leads relative to the tube T is not desired, that the member 66 could be made quadrant shaped like the member 60 to provide a chordially extending barrier.

From the foregoing, it should be apparent that a novel end fitting has been provided for use with axially slit, corrugated tubes and in which the end fitting 10 serves to locate the leads away from the axial slit 11 in the tube so that they cannot move along the slit and also serves to retain the leads within the tube T at a predetermined location.

Although the illustrated embodiment hereof has been described in great detail, it should be apparent that certain modifications, changes, and adaptations may be made in the illustrated embodiment, and that it is intended to cover all such modifications, changes, and adaptations which come within the spirit of the present invention.

What is claimed is:

1. An end fitting for attachment to a flexible, axially slit, corrugated tube for housing a plurality of electrical leads comprising:

a pair of sections of generally semicircular, cross-sectional shape and which are integrally hinged by a hinge means along their adjacent side edges thereof, said sections being foldable about said hinge means from an open position in which said sections are disposed side by side toward a closed position in which said sections surround an end portion of said corrugated tube, a latching means for latching said sections together in their closed position, one end portion of at least one of said sections having an arcuate, circumferentially and radially inwardly extending rib which is adapted to be received between adjacent corrugations of the corrugated tube to substantially lock said end fitting against relative movement axially of said tube, the other end portion of at least one of said sections having a radially inwardly extending member which defines a chordially extending barrier when said sections are in their closed position, said leads being adapted to be positioned on the side of said chordially extending barrier opposite the side adjacent the axial slit whereby said barrier positions said leads so that they cannot move axially along the slit.

2. An end fitting for attachment to a flexible, axially slit, corrugated tube for housing a plurality of electrical leads comprising:

a pair of sections of generally semicircular cross-sectional shape and which are integrally hinged by a hinge means along adjacent side edges thereof, said sections being foldable about said hinge means from an open position in which they are disposed side by side toward a closed position in which said sections surround an end portion of said corrugated tube and define a generally cylindrical end fitting, a releasable latching means comprising a catch member on one of said sections and a latch member on the other of said sections which is snap fittingly received in said catch member when said sections are moved toward their closed position to latch said sections together, one end portion of each of said sections having an arcuate and circumferentially and radially inwardly extending rib which is adapted to be received between adjacent corrugations of the corrugated tube to substantially lock said end fitting against relative movement axially of said tube, said other end portions of said sections each having a radially inwardly extending rib, said ribs on said other end portions together defining a chordially extending barrier when said sections are in their closed position and with a side wall portion of the end fitting an opening through which the leads are adapted to pass, said fitting being adapted to be attached to the tube so that said opening is located on the side opposite the side of the axial slit in the tube and said barrier serves to position it and locate leads so they pass through said opening.

3. An end fitting for attachment to a flexible, axially slit, corrugated tube for housing a plurality of electrical leads comprising:

a pair of sections of generally semicircular, cross-sectional shape and which are integrally hinged by a hinge means along adjacent side edges thereof, said sections being foldable about said hinge means from an open position in which said sections are disposed side by side toward a closed position in which said sections surround an end portion of said corrugated tube and define a generally cylindrical end fitting, a releasable latching means comprising a catch member on one of said sections and a latch member on the other of said sections which is snapped fittingly received in said catch member when said sections are moved toward their closed position to latch said sections together, one end portion of each of said sections having an arcuate and circumferentially and radially inwardly extending rib for being received between adjacent ones of the corrugations of the corrugated tube to substantially lock the end fitting against relative movement axially of said tube, the other end portion of one of said sections having a first radially inwardly extending rib and the other end portion of the other of said sections having a second radially inwardly extending rib, said first and second ribs having first sides which lie in a common plane when said sections are disposed side by side and said second rib having a second side which defines with said first side an obtuse included angle therebetween, said first rib and said second rib of said other end portions together defining a chordially extending barrier when the sections are moved to their closed position, said second rib having a triangularly shaped notch adjacent its first side for receiving one of the leads of said plurality of electrical leads in said corrugated tube, said second rib being for trapping one of the leads in said triangularly shaped groove and clamping it against the first side of said first rib when the sections are moved toward their closed position and said second side of said second rib being for causing the other of the leads to be cammed to the other side of the barrier so as to position the electrical leads in the end fitting and prevent the same from moving along the axial slit.

* * * * *